2,845,757
LATHE ATTACHMENT

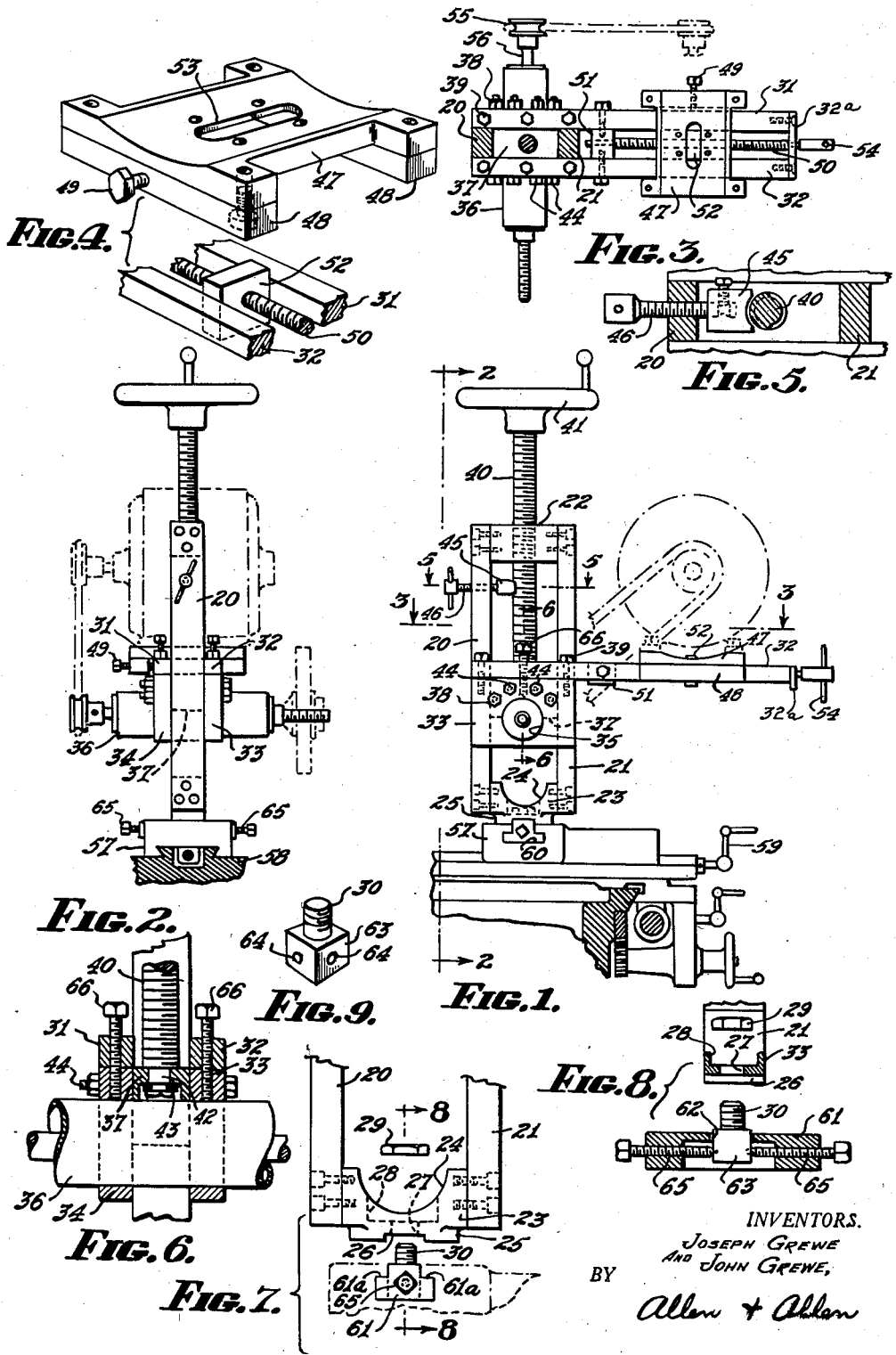

John Grewe and Joseph Grewe, Cincinnati, Ohio

Application September 14, 1955, Serial No. 534,252

3 Claims. (Cl. 51—259)

Our invention resides in the provision of a novel lathe attachment by means of which a selected tool may be readily adjusted with respect to the work and particularly in its vertical movement.

An object of our invention is to provide a lathe attachment especially suitable for receiving grinding means which can be shifted laterally in the attachment and which can be moved vertically as desired.

A further object of our invention is to provide a lathe attachment which can be used in place of the ordinary tool post mounted on the carriage of the lathe.

Yet another object of our invention is to provide means whereby the lathe attachment may be securely fastened to the lathe but which can readily be disengaged therefrom when necessary.

It is also an object of our invention to provide a lathe attachment in which a grinding spindle may be fastened and also having a member on which a separate motor for the grinding spindle may be mounted.

These and other objects of our invention will become apparent to those skilled in the art from a reading of the following description and with reference to the accompanying drawings. In these drawings like numerals are employed to designate like parts throughout, and Figure 1 is a side elevation of the attachment of this invention with portions of the lathe being shown in section, Figure 2 is a view taken on the line 2—2 of Figure 1, Figure 3 is a section taken on the line 3—3 of Figure 1, Figure 4 is a perspective view, fragmentary in part, showing the motor mount and means for adjusting it, Figure 5 is a section taken on the line 5—5 of Figure 1, Figure 6 is a section taken on the line 6—6 of Figure 1, Figure 7 is a fragmentary side elevation, in exploded condition, of the means by which the attachment is fastened to the lathe carriage, Figure 8 is a section taken on the line 8—8 of Figure 7 and Figure 9 is a perspective view of a portion of the means for fastening the lathe attachment to the lathe.

Referring now to the drawings it will become apparent that the lathe attachment of this invention is comprised of two basic frame sections, one of which is slidably mounted on the other. The upright frame section is comprised of the vertical members 20 and 21 which are bolted to a block 22 at their upper ends and to a block 23 at their lower ends. The block 23 is provided with an arcuate recess 24 and with a depending projection 25 having a slot 26 milled therein and a bore 27 extending through such slot. These latter details are perhaps best seen in Figure 7. A further recess 28 is provided in the lower curved face 24 of the block 23 in the region of the bore 27 in order to make it easy to reach the nut 29 which will be screwed on the stud 30 as will be described more fully shortly.

The lateral, slidable frame section includes a pair of frame members 31 and 32 joined at one end by a cross member 32a bolted thereto. At the other end these lateral frame members 31 and 32 are bolted to a pair of blocks 33 and 34 which extend beneath the lateral frame members and which extend the width of the upstanding frame members 20 and 21.

The members 33 and 34 are formed with circular openings to receive the housing 36 of a suitable grinding spindle. A block 37 is secured between the members 33 and 34. This block just nicely fits between the inner faces of the upstanding members 20 and 21 also. This block 37 has an arcuate recess which blends with the upper halves of the orifices 35. The block 37 extends downwardly only to the center line of these orifices. When the lateral frame section is moved to its lowermost position the blocks 37 and 23 will abut one another and together define what amounts to an orifice corresponding to those indicated at 35. Bolts 38 secure the members 33 and 34 to the block 37 while other bolts 39 secure the lateral frame members 31 and 32 to the members 33 and 34.

A screw 40 having a large handwheel 41 is threadedly received in the block 22. As perhaps best seen in Figure 6 the lower end of the screw 40 has a turn-down portion 42 which extends through an orifice provided in the top of the block 37. Adjacent the lower end of the turn-down portion 42 is a groove 43. A pair of bolts 44 extend through the side blocks 33 and 34 and the block 37. These bolts 44 pass within the confines of the groove 43. In this manner the complete lateral frame section comprised of the basic members 31, 32, 33, 34 and 37 is carried on the lower end of the screw 40. Thus when the vertical frame section is secured to the lathe as will be described the laterally extending horizontal frame section may be moved vertically simply by turning the screw 40. To this end the members 31, 32, 33, 34 and 37 all have nice sliding engagement with the various faces of the upright members 20 and 21.

In order to insure positive and accurate vertical adjustment of the movable frame section mounted on the screw 40 we provide the bearing member 45. This member is mounted on a screw 46 and when it is moved against the screw 40 it will prevent accidental movement of said screw as might otherwise be caused by vibration and the like.

We also provide a saddle or motor mount which is movable on the horizontal frame section. This is perhaps best illustrated in Figures 3 and 4 wherein the motor mount is indicated at 47. A pair of members 48 are fixed to the saddle 47 and these just nicely engage the side faces of the members 31 and 32. A set screw 49 will hold the saddle in place on the members 31 and 32 and when loosened will permit the saddle to be moved in a manner now to be described.

A screw 50 has a bearing in a member 51 and in the end plate 32a. A relatively large nut 52 is mounted on this screw between the bearing members. The upper portion of this nut 52 is received within a slot 53 provided in the bottom of the saddle. This nut extends between the inner faces of the members 32 and 31. It will be apparent that when the saddle rests on these latter members with the nut 52 engaged within the slot 53 longitudinal movement of said saddle may be obtained simply by loosening the set screw 49 and turning the screw 50 by means of the handle 54. It will be understood that the motor may be bolted or otherwise secured to the saddle 47. In this manner the belt extending from the motor drive pulley to the pulley 55 on the shaft 56 of the grinding spindle 36 may be tightened as desired.

Referring now to Figures 1, 7 and 8 we shall describe the means by which the lathe attachment is secured to the lathe. The lathe may be considered conventional and includes a carriage 57 mounted on ways 58 and movable by turning the member 59. The carriage 57 is provided with an inverted T-slot 60 to which the ordinary tool post is normally fastened. This tool post we replace with the lathe attachment herein described although we do make use of the T-slot 60 as will appear shortly.

We provide an elongated member 61 which is itself T-shaped in cross-section and which is designed to be received in the slot 60. The member 61 is formed with a square orifice centrally thereof to receive a block 63 carrying the stud 30. This block 63 has indentations 64 provided in the sides thereof. A pair of screws 65 is mounted lengthwise of the T-shaped member 61 and these screws have ends adapted to engage within the indentations 64 of the block 63. By engaging the ends of these screws within the indentations 64 the block 63 may be held securely within the square orifice 62 of the member 61.

With the member 63 secured in place as just described the T-shaped member 61 may be moved into the slot 60. When the lathe attachment is brought into place the bottom surface of the projection 25 will rest on the upper surface of the member 57. At this time the stud 30 will be received within the orifice 27 of the member 23. By tightening the nut 29, thus drawing the T-shaped member 61 upwardly within the slot 60 so that the upper faces of the lateral T-extensions 61a will abut the upper regions of the member 57 defined by the slot 60, the lathe attachment may thus be secured in place. After the attachment has been secured in the manner described it is possible that one might wish to turn the attachment through 90 degrees. This one can do simply by loosening the screws 65 and turning the block 63, which carries the stud 30, through a quarter turn, there being orifices 64 in all four lateral faces of this block. This enables the attachment to be turned without having to loosen the nut 29 and this is sometimes very desirable. Resetting the screws 65 in the indentations 64 and tightening them will again secure the attachment in place.

In operation it will be understood that a grinding spindle or a suitable tool as illustrated at 36 will be placed within the orifices 35 of the members 33 and 34. Such tool will also be received within the arcuate portion of the member 37. Set screws 66 passing through the members 32, 33 and 31, 34 will keep the tool 36 in proper position. As has been pointed out the frame assembly 31, 32, 33, 34 and 37 is mounted on the lower end of the screw 40 by means of the bolts 44 which pass through the members 33, 34 and 37 and engage within the slot 43 of the turn-down portion 42. The movement of the screw 40 within the member 22 of the upstanding frame portion will thus cause the tool 36 to be moved vertically. The arcuate portion 24 of the block 23 permits extreme lower movement of the tool 36. In this extreme low position the blocks 23 and 37 will virtually surround the tool member 36.

It will be apparent that not only may the tool 36 be shifted within the orifices 35 by loosening and tightening the screw 66, and not only can the vertical position of this tool be varied by movement of the screw 40, but also the motor saddle, which is mounted on the same frame assembly as the tool, may be moved as desired by loosening the screw 49 and manipulating the handle 54 of the screw 50. In addition, the position of the attachment with respect to the carriage may be varied even while the nut 29 is in place simply by loosening the screw 65 and withdrawing the attachment plus stud 30 and block 63 whereby to turn all through a quarter turn and then replace the block 63 within the square orifice 62 of the member 61, the screw 65 then being tightened into engagement with the orifices 64.

We have found the lathe attachment herein described to be extremely stable and capable of permitting very accurate work to be performed. Very fine vertical adjustments may be made by manipulating the large screw 40 and these may be maintained positive by the bearing 45.

It will be understood that modifications may be made in this invention without departing from its scope and spirit. It should be further understood that while we have shown our invention as embodied in particular arrangements and structures we do not intend to be limited to such arrangements and structures except insofar as they are specifically set forth in the subjoined claims.

Having thus described our invention what we claim as new and what we desire to protect by United States Letters Patent is:

1. A lathe attachment comprising a first frame section; said first frame section comprising a pair of vertically disposed parallel bars; a second frame section vertically slideable on said first frame section; a vertical screw mounted in said first section; means connecting said second section to the lower end of said screw; means to fix said first section on a base; tool holding means in said second frame section; and said second frame section comprising a pair of horizontally disposed parallel rails, a first block fixed to one end of one of said rails, a second block fixed to the corresponding end of the other of said rails, said first and said second blocks engaging said vertically disposed parallel bars between them, a third block fixed between said first and second blocks, the said means for connecting said second section to said screw being located in said third block, and a cross member fixed to the other ends of said rails.

2. A lathe attachment comprising a first frame section; said first frame section comprising a pair of vertically disposed parallel bars, blocks fixed between said bars at their upper and lower ends, said lower block having a bearing surface to engage a base; a second frame section vertically slidable on said first frame section; a vertical screw mounted in said first section; said screw engaging said upper block; means connecting said second section to the lower end of said screw, said means including a member slidable between said vertically disposed parallel bars and a turned-down extension on the lower end of said screw, said slidable member having an orifice receiving said extension, a groove in said extension, and bolts in said slidable member received in said groove; means to fix said lower block on said base so as to maintain said first section in desired position; and tool holding means in said second frame section.

3. A lathe attachment comprising a first frame section; a second frame section vertically slidable on said first frame section; a vertical screw mounted in said first section; means connecting said second section to the lower end of said screw; means to fix said first section on a base; tool holding means in said second frame section; and the means for fixing said first section on said base comprising an elongated inverted T-shaped member, a stud projecting upwardly from said T-shaped member, a bearing block fixed to the lower end of said first frame section, said bearing block having an orifice to receive said stud, a nut engaging said stud and abutting said bearing block, said T-shaped member being receivable in a corresponding slot provided in a lathe member, said T-shaped member being provided with a square orifice, said stud being fixed on a square block receivable in said orifice, said block having indentations in its side faces, and screws in said T-shaped member engaging with said indentations.

References Cited in the file of this patent

UNITED STATES PATENTS

| | | |
|---|---|---|
| 1,281,764 | Clark | Oct. 15, 1918 |
| 2,074,844 | Hill | Mar. 23, 1937 |
| 2,453,020 | Koett | Nov. 2, 1948 |
| 2,453,315 | Harbison | Nov. 9, 1948 |
| 2,458,472 | Irwin | Jan. 4, 1949 |
| 2,522,819 | Glynn | Sept. 19, 1950 |
| 2,629,292 | McCullough | Feb. 24, 1953 |